United States Patent [19]
Edwards

[11] Patent Number: 5,305,546
[45] Date of Patent: Apr. 26, 1994

[54] INSECT CATCHING APPARATUS

[75] Inventor: David L. Edwards, Leeds, United Kingdom

[73] Assignee: James F. King, Leeds, United Kingdom

[21] Appl. No.: 949,827

[22] PCT Filed: May 17, 1991

[86] PCT No.: PCT/GB91/00778
§ 371 Date: Dec. 28, 1992
§ 102(e) Date: Dec. 28, 1992

[87] PCT Pub. No.: WO91/17654
PCT Pub. Date: Nov. 28, 1991

[30] Foreign Application Priority Data
May 18, 1990 [GB] United Kingdom ............. 9011229

[51] Int. Cl.⁵ .............................................. A01M 5/02
[52] U.S. Cl. ................................................ 43/134
[58] Field of Search ................ 43/134, 135, 136, 137, 43/132.1, 133, 12, 11; 56/337, 332

[56] References Cited

U.S. PATENT DOCUMENTS

| | | | |
|---|---|---|---|
| 681,203 | 8/1901 | Eddy | 56/337 |
| 740,481 | 10/1903 | Southwood | 43/134 |
| 816,499 | 3/1906 | Pierce | 43/134 |
| 1,133,927 | 3/1915 | Buzard | 56/337 |
| 1,214,450 | 1/1917 | Gifford | 56/337 |
| 1,750,163 | 3/1930 | Disney | 43/134 |
| 4,272,906 | 6/1981 | Liebling | 43/134 |

FOREIGN PATENT DOCUMENTS

| | | |
|---|---|---|
| 8511784 | 11/1985 | Fed. Rep. of Germany . |
| 3926573 | 3/1990 | Fed. Rep. of Germany . |
| 174417 | 2/1922 | United Kingdom . |
| 1217259 | 12/1970 | United Kingdom . |

*Primary Examiner*—Paula A. Bradley
*Assistant Examiner*—Chuck Y. Mah
*Attorney, Agent, or Firm*—Edwin D. Schindler

[57] ABSTRACT

An apparatus for catching insects is disclosed, which includes an insect-carrying chamber having an opening large enough to allow an insect to pass therethrough. The opening is closable by way of a shutter so that when the insect enters the chamber, it may be trapped therein by moving the shutter to its closed position.

5 Claims, 2 Drawing Sheets

INSECT CATCHING APPARATUS

FIELD OF THE INVENTION

The invention relates to apparatus for catching insects.

It will be appreciated that there are a number of "creepy crawly" type household pests which are generally referred to as insects which are not strictly members of the insect family. Examples of this are spiders. For the purposes of this specification, the term insects will be taken to include any such creature and encompass flies, beetles, spiders, bees, wasps and moths, and other similar creatures.

The commonest methods of disposing of insects include spraying the insect with a fly spray including insecticide, using an attractive light to attract insects to it and kill them, and even more commonly, hitting the insect with any convenient object to hand, usually a rolled up newspaper. The disadvantage of the first method is that it adds to air pollution, and also many people dislike seeing an insect die in this manner. The types of attractive light which are often used in for example, food shops, can be expensive to run. The swatting of an insect can involve skill since it is sometimes difficult to swat an insect before it moves away. Often, a greasy smear will be left on whichever surface the insect has been "swatted". More importantly, all these methods rely on the killing of the insect to remove it. Trying to remove an insect from an environment where it is not wanted, without killing it, usually involves either picking it up with the hand or trying to scoop the insect up to move it away. Apart from the fact that many people are scared of insects, in many cases, this is just not practical. Many people would like to avoid killing the insect to try to conserve the insect population. This is especially noticeable with bees, but often killing is the only convenient way of disposing of an insect.

SUMMARY OF THE INVENTION

According to the invention, there is provided apparatus for catching insects, comprising an insect carrying chamber adapted to hold an insect including an opening large enough to allow an insect to pass therethrough, the opening having a periphery lying in one plane such that if the insect carrying chamber is placed with its opening against a substantially planar surface, a closed space is defined between the surface and the insect carrying chamber, the apparatus including a shutter readily movable between a first position where the shutter lies over the opening to define a closed space between the shutter and the insect carrying chamber, and a second position where the shutter does not obscure the opening to leave it fully open, the apparatus including means to hold the insect carrying chamber and move it to its in-use position with its opening periphery against a substantially planar surface, the apparatus being arranged such that in said in-use position the shutter is readily movable from its second position to its first position.

The apparatus is used by placing the insect carrying chamber over an insect that is positioned on a substantially planar surface so that the insect lies within the closed space defined between the insect chamber and the surface, and then closing the shutter by moving it from its second position to its first position so that the insect is held securely within the space defined by the chamber and the shutter. The apparatus can then be moved to another location where the shutter can be moved to its second position to allow the insect to escape.

The advantage of using such apparatus is that the insect can be caught effectively on any surface on which it sits, and can be readily disposed of without having to kill the insect.

The means to hold the insect carrying chamber may just be that the chamber is shaped so as to be easily hand held, but preferably the apparatus includes a handle to hold the chamber. Preferably this handle is a long handle so that the chamber can be used to reach insects in inaccessible positions. Also, the long handle allows the user to keep remote from the catching of an insect. This is especially important when the user is either frightened of the insect, or the insect is one such as a wasp or hornet in which a sting or bite should be avoided.

Preferably the shutter is arranged such that it can be operated from the end of such a long handle.

However, the usual place for catching insects is when they gather on vertical surfaces such as windows. This is the most common area where flies congregate on windows, and in this case, conveniently, the shutter is gravity operated. In this case, preferably the shutter is arranged to move from its first to second position depending on the attitude of the insect carrying chamber. Clearly, if the shutter is gravity operated the apparatus has to include stops on the chamber and the shutter to define the limit position of the shutter. The shutter may be a rotating shutter which rotates about a pivot so that the shutter can readily be moved to its closed position by rotating the insect carrying chamber. Alternatively and preferably, the gravity operated shutter is one which slides. Thus, the shutter is moved from its open to closed position by positioning the apparatus such that the shutter can slide downwards. The chamber is then carried to a point where the insect can be released and the chamber is then rotated through 180° to allow the shutter to slide open to allow the insect to fly away.

In most cases, the apparatus will be used indoors, either in an office, shop or in the home, and the insect will be released outside. Additionally, the apparatus may be used in a car or caravan.

In the United Kingdom, the insects to be caught by the apparatus are relatively small, and therefore the opening size need not exceed the size of, for example, 7.5 centimeters by 6 centimeters. However, in many cases the size of insects to be caught on most occasions will be much smaller than this and thus, the apparatus may be made much smaller. This is particularly convenient if the apparatus should be used in an environment such as a car.

However, in some countries the insects to be caught will be much larger and in this case the apparatus will similarly have to be enlarged.

In countries where the insects to be caught, in a domestic environment, could be dangerous, preferably the apparatus includes means to fit the opening over an insect collection chamber so that the insects are released from the apparatus, not into the open environment, but into a collection chamber so that they will cause no danger.

Preferably, the chamber is attached to a long handle by a flexible joint which allows manoeuvrability of the chamber about the surface on which the insect is to be caught. Conveniently this flexible joint maybe provided by a close coiled spring into which the handle is inserted. Such a close coiled spring can act as a universal joint.

Preferably, the insect carrying chamber and shutter are made of plastics and conveniently such plastics can be injection moulded.

Preferably, at least the chamber is constructed from transparent plastics material since this allows the user to check that they have successfully caught the insect they require.

BRIEF DESCRIPTION OF THE DRAWINGS

An apparatus for catching insects in accordance with the invention will now be described, by way of example only, with reference to the accompanying drawings, in which:-

DESCRIPTION OF THE PREFERRED EMBODIMENTS

Apparatus 1 is adapted for catching insects without having to kill them. The apparatus consists of an insect carrying chamber 3 arranged to hold an insect. It is sized such that it can hold an insect and the shape of the insect carrying chamber is a square or rectangular based pyramid in that it has a substantially rectangular vertical cross-section which tapers. The insect carrying chamber includes an opening 5 having a substantially planar periphery 7. The insect carrying chamber 3 can be placed with its periphery 7 lying on a substantially planar surface to define a closed space between the chamber 3 and the surface.

Figure 1:
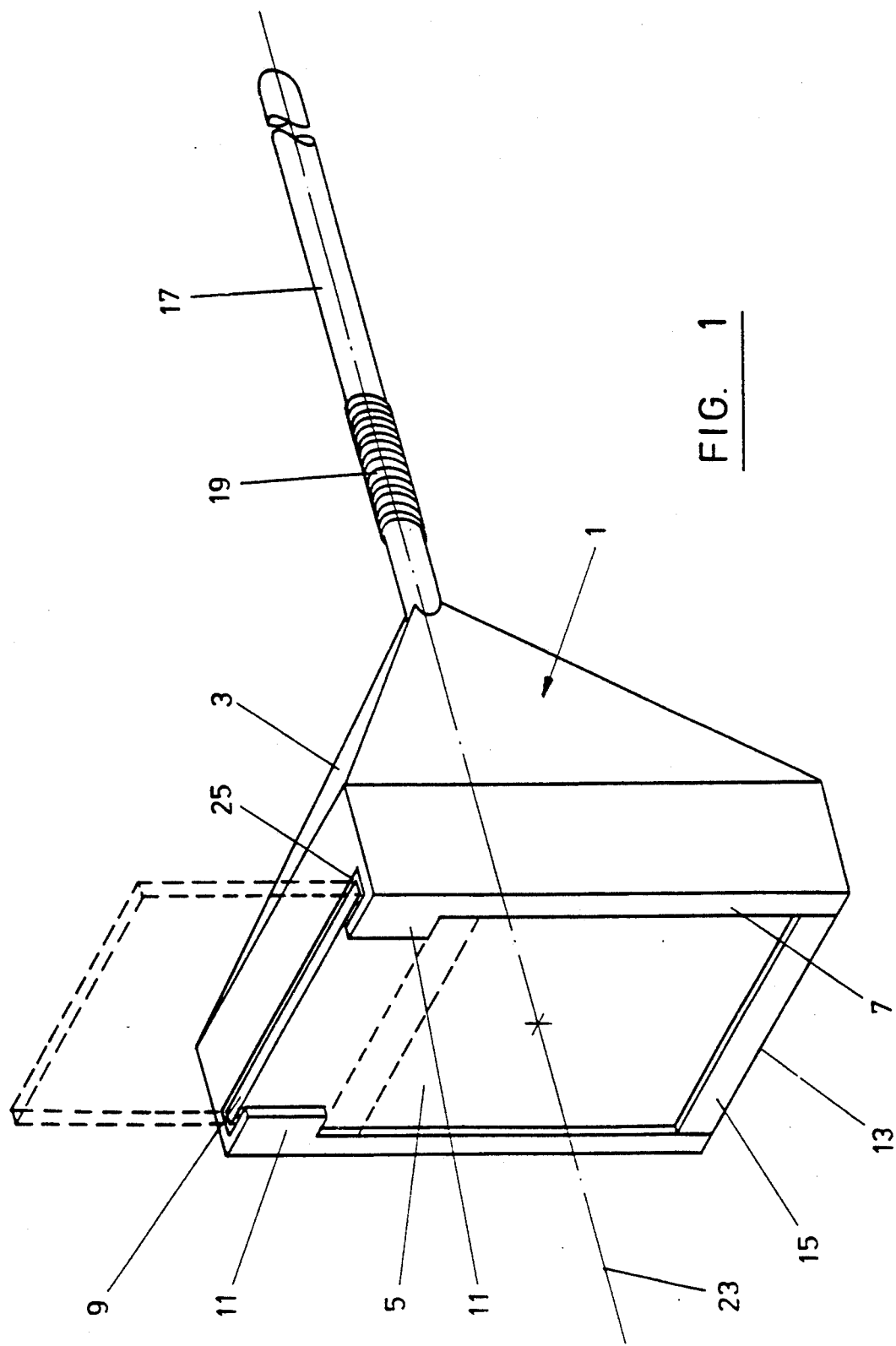
FIG. 1 is a perspective view of the apparatus.
Figure 2:
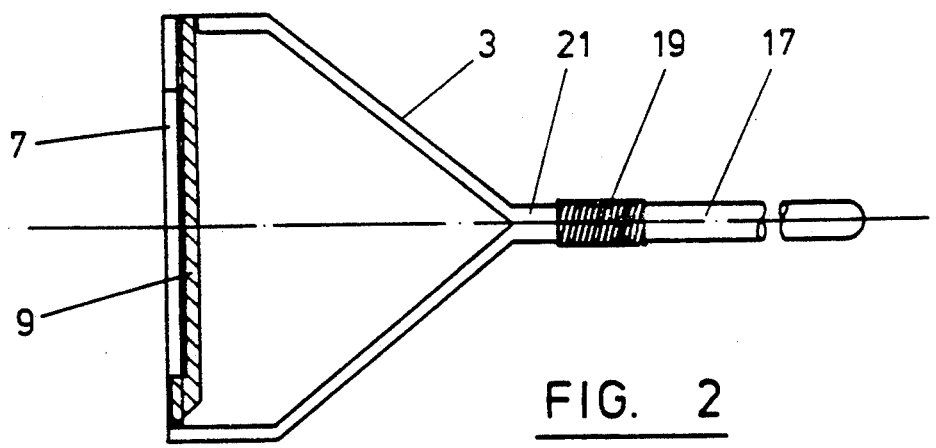
FIG. 2 is a side elevation of the apparatus.
Figure 3:
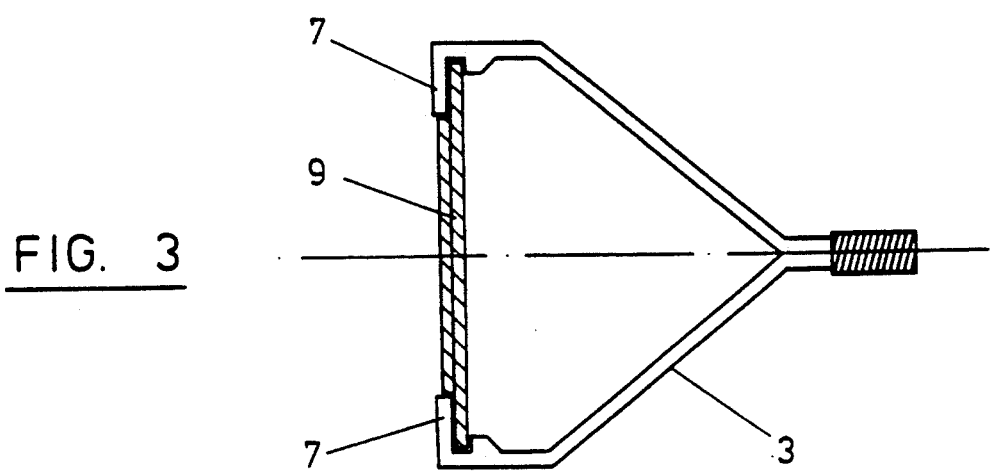
FIG. 3 is a plan of the apparatus; and,
FIG. 4 is an end elevation of the apparatus.
Figure 4:
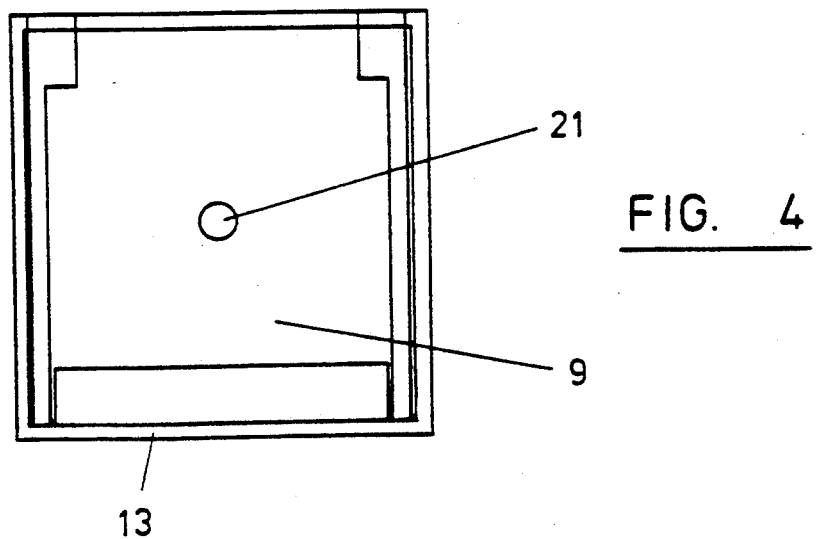

The apparatus includes a shutter 9 which is readily movable between a first position shown in FIGS. 1 to 3, in which the shutter passes over the opening 5 to close it to define a closed chamber between the shutter 9 and the chamber 3. The shutter 9 is movable to a second position shown in dotted line in FIG. 1, in which the opening 5 is left unobscured. The shutter 9 is readily movable between it first and second positions by means of gravity only. The chamber 3 includes two upper stops 11 and a base stop 13 which are engaged by the shutter stop 15.

The apparatus includes means 17 for holding the chamber 3. The means 17 consists of an elongate wooden handle 17 which is coupled to the chamber via closely coiled spring 19 which serves as a universal joint. The coiled spring 19 passes over the end of the wooden handle 17 and also over the end of a cylindrical projection 21 which forms an integral part of the chamber 3. In this way, the handle 17 can be hand held and allow access to insects that are in inaccessible places. The universal joint 19 allows for flexibility and therefore manoeuvring of the chamber 3 into position. The chamber 3 is made of injection moulded clear plastics, typically acrynitrilebutadeine styrene (ABS). The shutter is similarly injection moulded of clear plastics.

This allows the user to see inside the chamber 3 to check what insects are inside it.

In use, the user rotates the handle and chamber 3 about 180° about central axis 23 from the position shown in FIG. 1 so that the shutter 9 slides downwards until shutter stop 15 engages the pairs of chamber stops 11 so that the shutter lies in the position shown in dotted line in FIG. 1. This defines the second open position of the apparatus. The apparatus is then manoeuvred so that the opening 5 is placed over an insect lying on a substantially vertical surface, usually a window, to trap the insect between the vertical surface and the chamber 3. The apparatus is then rotated through 180° around centre line 23 so that it lies in a position shown in FIG. 1 so that the shutter 9 slides downwards so that its shutter stop 15 engages base stop 13 to define the limit of the movement to close the opening completely to entrap the insect within the closed space defined between the shutter 9 and the chamber 3. In this attitude the apparatus is then carried to the outside where the insect is to be disposed of. The apparatus is rotated through 180° to allow the shutter to open and allow the insect to escape.

The shutter 9 lies within a groove 25 spaced from the periphery of the opening. In this way, when the periphery is in contact with a surface, the shutter can still slide freely within the groove 25.

This provides a quick and convenient method of disposing of insects without having to kill them.

I claim:

1. Apparatus for catching insects, comprising an insect-carrying chamber adapted to hold an insect including an opening large enough to allow an insect to pass therethrough, the opening having a periphery lying in one plane such that if the insect-carrying chamber is placed with its opening against a substantially planar surface, a closed space is defined between the surface and the insect carrying chamber, the apparatus including a gravity operated shutter readily movable between a first position where the shutter lies over the opening to define a closed space between the shutter and the insect-carrying chamber, and a second position where the shutter does not obscure the opening to leave it fully open, the apparatus including means to hold the insect-carrying chamber and move it to its in-use position with its opening periphery against a substantially planar surface, the apparatus being arranged such that in said in-use position the shutter is readily movable, by the operation of gravity, from its second position to its first position.

2. Apparatus according to claim 1 wherein the means to hold the insect-carrying chamber includes a long handle to enable the apparatus to reach insects in inaccessible positions.

3. Apparatus in accordance with claim 1 in which the shutter is arranged for sliding movement relative to the insect-carrying chamber.

4. Apparatus according to claim 1 wherein the chamber is attached to a long handle by means of a flexible joint allowing manoeuvrability of the chamber about the surface on which the insect is to be caught.

5. Apparatus according to claim 1 in which the insect-carrying chamber and shutter are made of transparent plastics material.

* * * * *